United States Patent
Wang et al.

(10) Patent No.: US 11,579,281 B2
(45) Date of Patent: Feb. 14, 2023

(54) METHOD AND DEVICE FOR SUPPRESSING RANGE AMBIGUITY

(71) Applicant: Institute of Electronics, Chinese Academy of Sciences, Beijing (CN)

(72) Inventors: Yu Wang, Beijing (CN); Dacheng Liu, Beijing (CN); Pengfei Zhao, Beijing (CN); Yunkai Deng, Beijing (CN)

(73) Assignee: Institute of Electronics, Chinese Academy of Sciences, Beijing (CN)

( * ) Notice: Subject to any disclaimer, the term of this patent is extended or adjusted under 35 U.S.C. 154(b) by 455 days.

(21) Appl. No.: 16/795,050

(22) Filed: Feb. 19, 2020

(65) Prior Publication Data
US 2020/0271772 A1    Aug. 27, 2020

(30) Foreign Application Priority Data
Feb. 21, 2019 (CN) .......................... 201910130093.2

(51) Int. Cl.
```
G01S 13/10      (2006.01)
G01S 13/90      (2006.01)
G06N 7/08       (2006.01)
G01S 7/02       (2006.01)
G01S 7/28       (2006.01)
```
(52) U.S. Cl.
CPC .......... G01S 13/106 (2013.01); G01S 7/025 (2013.01); G01S 7/2813 (2013.01); G01S 13/9076 (2019.05); G06N 7/08 (2013.01)

(58) Field of Classification Search
None
See application file for complete search history.

(56) References Cited

U.S. PATENT DOCUMENTS

| | | | |
|---|---|---|---|
| 2018/0224535 A1* | 8/2018 | Sankar | G01S 17/88 |
| 2018/0259639 A1 | 9/2018 | Rubel et al. | |
| 2018/0335518 A1* | 11/2018 | Fox | G01S 7/025 |

FOREIGN PATENT DOCUMENTS

| | | |
|---|---|---|
| CN | 104777460 A | 7/2015 |
| CN | 106569212 A | 4/2017 |
| CN | 107561535 A | 1/2018 |
| CN | 109343009 A | 2/2019 |

(Continued)

OTHER PUBLICATIONS

First Office Action of the Chinese application No. 201910130093.2, dated Jun. 3, 2020.

(Continued)

*Primary Examiner* — Whitney Moore
(74) *Attorney, Agent, or Firm* — ArentFox Schiff LLP; Michael Fainberg

(57) ABSTRACT

A method and device for suppressing range ambiguity and a computer readable storage medium are provided. The method includes: determining a pulse timing relationship of a transmission signal; determining orthogonal nonlinear frequency modulation signals; modulating the transmission signal by using the orthogonal nonlinear frequency modulation signals; transmitting the modulated transmission signal according to the pulse timing relationship, and determining echo data of the modulated transmission signal; and generating an image according to a polarization scattering matrix for the echo data of the modulated transmission signal.

17 Claims, 4 Drawing Sheets

(56) References Cited

FOREIGN PATENT DOCUMENTS

| | | |
|---|---|---|
| CN | 109343058 A | 2/2019 |
| CN | 109343059 A | 2/2019 |

OTHER PUBLICATIONS

"New Insights Into Ambiguities in Quad-Pol SAR", Michelangelo Villano, Gerhard Krieger, and Alberto Moreira, IEEE Transactions on Geoscience and Remote Sensing, vol. 55, No. 6, pp. 3287-3308, Jun. 30, 2017.
Zhu, Xiaojing et al. "Range Ambiguity Suppression Approach for Quad-pol SAR Systems Based on Modified Azimuth Phase Coding"; Journal of Radars; Aug. 31, 2017.

\* cited by examiner

METHOD AND DEVICE FOR SUPPRESSING RANGE AMBIGUITY

CROSS-REFERENCE TO RELATED APPLICATIONS

This application claims priority to Chinese Patent Application No. 201910130093.2, entitled "METHOD AND DEVICE FOR SUPPRESSING RANGE AMBIGUITY, AND COMPUTER READABLE STORAGE MEDIUM", filed on Feb. 21, 2019, the entire contents of which are incorporated herein by reference.

BACKGROUND

An antenna directivity pattern in a pitching direction (range) of a radar is not an ideal beam, and an actual width covered by a beam in a pitching direction of the antenna is greater than a swath. Therefore, echo energy is also returned in a range out of a swath region irradiated by a main lobe. The external echo is mixed with the available echo in the swath, which reduces the quality of a radar image after signal processing. The energy in this part is referred to as range ambiguity.

A quadrature polarimetric (quad-pol) synthetic aperture radar (SAR) is a tendency for research and development of SAR. Compared with a single polarimetric SAR, the quad-pol SAR may detect abundant scattering information of ground objects. However, a key problem in the quad-pol SAR system lies in that a cross polarimetric (cross-pol) channel is interfered by a co-polarimetric (co-pol) range ambiguity signal to aggravate range ambiguity of the quad-pol SAR system.

SUMMARY

The embodiments of the disclosure relate to the technical field of communications, and also relate but are not limited to a method and a device for suppressing range ambiguity, and a computer readable storage medium.

The technical solutions in the embodiments of the disclosure are implemented as follows.

In a first aspect, a method for suppressing range ambiguity is provided, which includes the following operations.

A pulse timing relationship of a transmission signal is determined.

Orthogonal nonlinear frequency modulation signals are determined.

The transmission signal is modulated by using the orthogonal nonlinear frequency modulation signals.

The modulated transmission signal is transmitted according to the pulse timing relationship, and echo data of the modulated transmission signal is determined.

An image is generated according to a polarization scattering matrix for the echo data of the modulated transmission signal.

In a second aspect, a device for suppressing range ambiguity is provided, which includes a processor, and a memory configured to store a computer program capable of running on the processor. The processor, when the computer program runs thereon, executes operations as follows.

A pulse timing relationship of a transmission signal is determined.

Orthogonal nonlinear frequency modulation signals are determined.

The transmission signal is modulated by using the orthogonal nonlinear frequency modulation signals.

The modulated transmission signal is transmitted according to the pulse timing relationship, and echo data of the modulated transmission signal is determined.

An image is generated according to a polarization scattering matrix for the echo data of the modulated transmission signal.

In a third aspect, a computer readable storage medium having stored thereon a computer program is provided. The computer program, when executed by a processor, implements operations as follows.

A pulse timing relationship of a transmission signal is determined.

Orthogonal nonlinear frequency modulation signals are determined.

The transmission signal is modulated by using the orthogonal nonlinear frequency modulation signals.

The modulated transmission signal is transmitted according to the pulse timing relationship, and echo data of the modulated transmission signal is determined.

An image is generated according to a polarization scattering matrix for the echo data of the modulated transmission signal.

DETAILED DESCRIPTION

The disclosure is further described below in combination with the accompanying drawings and specific embodiments.

Figure 1:
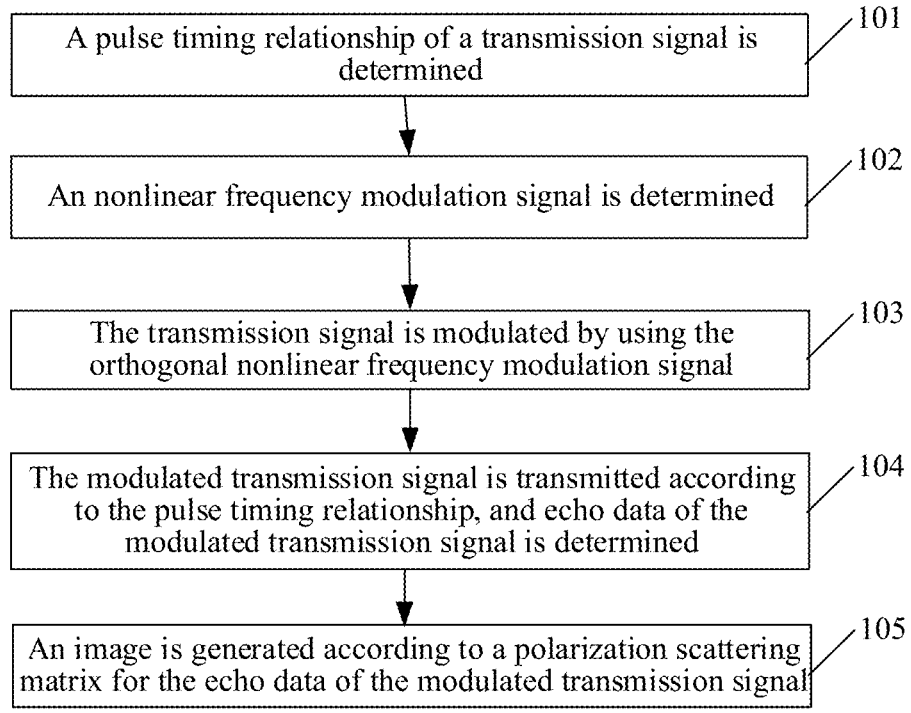
FIG. 1 is a schematic flowchart of a method for suppressing range ambiguity according to an embodiment of the disclosure.

FIG. 1 is a schematic flowchart of a method for suppressing range ambiguity according to an embodiment of the disclosure. As shown in FIG. 1, the method includes the following operations.

At 101, a pulse timing relationship of a transmission signal is determined.

In actual applications, the pulse timing relationship of the transmission signal may be determined based on a pulse repetition frequency of the transmission signal in a hybrid polarimetric SAR system.

In an embodiment, the operation that a pulse timing relationship of a transmission signal is determined includes an operation as follows. The pulse timing relationship of the transmission signal is determined according to a pulse repetition frequency of the transmission signal. The pulse timing relationship is represented as PRI=1/PRF, and PRF denotes the pulse repetition frequency of the transmission signal.

The pulse timing relationship is defined as PR=1/PRF, where PRF denotes a pulse repetition frequency. It is supposed that the pulse repetition frequency of the transmission signal in the hybrid polarimetric SAR system is 2PRF, the pulse timing relationship is PRI/2.

For a single transmission channel such as L or R of the hybrid polarimetric SAR system that transmits a signal alternately, the pulse repetition frequency of the transmission signal is represented as $PRF_S$=PRF, and the pulse timing relationship for transmitting a pulse is represented as $PRI_S$=1/$PRF_S$=PRI At 102, orthogonal nonlinear frequency modulation signals are determined. The orthogonal nonlinear frequency modulation signals are determined based on a search algorithm. The search algorithm may include an augmented Lagrange algorithm, a greedy algorithm, a Lagrange genetic simulated annealing hybrid algorithm or the like.

In an embodiment, the operation that orthogonal nonlinear frequency modulation signals are determined includes operations as follows. A time-frequency relationship function of the nonlinear frequency modulation signal is determined according to a piecewise linear function. A time domain function of the nonlinear frequency modulation signal is determined according to the time-frequency relationship function. A correlation performance parameter of the nonlinear frequency modulation signal is determined according to the time domain function. A mathematical model of the nonlinear frequency modulation signal is determined according to the correlation performance parameter. The nonlinear frequency modulation signal is initialized according to pulse width and bandwidth settings of the nonlinear frequency modulation signal. Iteration is performed on the initialized nonlinear frequency modulation signal by using an augmented Lagrange algorithm according to the mathematical model to obtain the orthogonal nonlinear frequency modulation signals.

A time-frequency relationship function of the nonlinear frequency modulation signal is determined according to a piecewise linear function, a time domain function of the nonlinear frequency modulation signal is determined according to the time-frequency relationship function, and a correlation performance parameter of the nonlinear frequency modulation signal is determined according to the time domain function. The correlation performance parameter may include a self-correlation performance parameter and a cross-correlation performance parameter. A mathematical model of the nonlinear frequency modulation signal is determined according to the correlation performance parameter. For example, a first mathematical model of the nonlinear frequency modulation signal is determined according to the self-correlation performance parameter, and a second mathematical model of the nonlinear frequency modulation signal is determined according to the cross-correlation performance parameter. The nonlinear frequency modulation signal is initialized according to pulse width and bandwidth settings of the nonlinear frequency modulation signal. Iteration is performed on the initialized nonlinear frequency modulation signal by using an augmented Lagrange algorithm according to the mathematical model until the algorithm is converged, to obtain the orthogonal nonlinear frequency modulation signals.

At 103, the transmission signal is modulated by using the orthogonal nonlinear frequency modulation signals.

The transmission signal is modulated by using the orthogonal nonlinear frequency modulation signals. In the hybrid polarimetric SAR system, the transmission signal is a left circular polarization signal and a right circular polarization signal.

In an embodiment, the transmission signal includes a left circular polarization signal and a right circular polarization signal, and the operation that the transmission signal is modulated by using the orthogonal nonlinear frequency modulation signals includes the following operations.

The left circular polarization signal is modulated by using $s_1$, and the right circular polarization signal is modulated by using $s_2$, $s_1$ and the $s_2$ being the orthogonal nonlinear frequency modulation signals.

The orthogonal nonlinear frequency modulation signals are defined as $s_1$ and $s_2$. The transmission signal includes a left circular polarization signal and a right circular polarization signal. The left circular polarization signal is modulated by using $s_1$. The right circular polarization signal is modulated by $s_2$.

At 104, the modulated transmission signal is transmitted according to the pulse timing relationship, and echo data of the modulated transmission signal is determined.

The transmission signal modulated by $s_1$ and $s_2$ is transmitted alternately according to the pulse timing relationship, and the echo data of the modulated transmission signal is determined.

In an embodiment, the method further includes an operation as follows. A polarization scattering matrix for the echo data of the transmission signal is determined.

Correspondingly, the operation that the modulated transmission signal is transmitted according to the pulse timing relationship, and echo data of the modulated transmission signal is determined includes the following operations.

The modulated transmission signal is transmitted alternately according to the pulse timing relationship.

The echo data of the modulated transmission signal is determined according to the pulse timing relationship and the polarization scattering matrix, the echo data of the modulated transmission signal is represented in a form of the polarization scattering matrix $S_{CTLR}$, $$S_{CTLR} = \begin{pmatrix} S_{HL} & S_{HR} \\ S_{VL} & S_{VR} \end{pmatrix},$$

where, $$S_{HL} = \hat{S}_{HH} + j\hat{S}_{HV}, (s_1)$$

$$S_{HR} = \hat{S}_{HH} - j\hat{S}_{HV}, (s_2)$$

$$S_{VL} = \hat{S}_{VH} + j\hat{S}_{VV}, (s_1)$$

$$S_{VR} = \hat{S}_{VH} - j\hat{S}_{VV}, (s_2).$$

$S_{HL}$ denotes an echo of an echo channel having a transmission channel L and a receiving channel H for the modulated transmission signal, $S_{HR}$ denotes an echo of an echo channel having a transmission channel R and a receiving channel H for the modulated transmission signal, $S_{VL}$ denotes an echo of an echo channel having a transmission channel L and a receiving channel V for the modulated transmission signal, $S_{VR}$ denotes an echo of an echo channel having a transmission channel R and a receiving channel V for the modulated transmission signal, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

The left circular polarization signal is modulated by using the orthogonal nonlinear frequency modulation signal $s_1$, and the right circular polarization signal is modulated by using the orthogonal nonlinear frequency modulation signal $s_2$. With taking $S_{HL}$ in an HL channel as an example, due to an alternate transmission characteristic of a signal, a first ambiguity region of an echo of the HL channel is a range ambiguity echo of an HR channel. The signal $s_2$ different from the signal $s_1$ of the HL channel is employed by the HR channel. In this way, due to an orthogonal characteristic of the pair of signals, when the echo is imaged, the echo of $s_1$ in the HL channel can be well focused, and the range ambiguity echo of $s_2$ of the HR channel is defocused, thereby avoiding the quality of a main HL image from being affected severely, and achieving a requirement for suppressing range ambiguity energy in the polarimetric SAR system.

In an embodiment, the polarization scattering matrix $S_{CTLR}$ for the echo data of the transmission signal is represented as $$S_{CTLR} = \begin{pmatrix} S_{HL} & S_{HR} \\ S_{VL} & S_{VR} \end{pmatrix}.$$

$S_{HL}$ denotes an echo of an echo channel having a transmission channel L and a receiving channel H, $S_{HR}$ denotes an echo of an echo channel having a transmission channel R and a receiving channel H, $S_{VL}$ denotes an echo of an echo channel having a transmission channel L and a receiving channel V, $S_{VR}$ denotes an echo of an echo channel having a transmission channel R and a receiving channel V, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

In the hybrid polarimetric SAR system, the transmission signal is scattered via the ground or an object, and the polarization scattering matrix for echo data of the transmission signal is determined.

In the hybrid polarimetric SAR system, the transmission signal has a transmission channel L or R and a receiving channel H or V. An echo channel of the transmission signal is defined as [HL, HR, VL and VR], and a polarization scattering matrix for an echo is defined as $$S_{CTLR} = \begin{pmatrix} S_{HL} & S_{HR} \\ S_{VL} & S_{VR} \end{pmatrix},$$

where $S_{HL}$ denotes an echo of an echo channel having a transmission channel L and a receiving channel H, and $S_{HR}$, $S_{VL}$ and $S_{VR}$ denotes in a similar manner as $S_{HL}$.

In an embodiment, the operation that the polarization scattering matrix for the echo data of the transmission signal is determined includes the following operations.

Ground object scattering coefficients $S_{HL}$, $S_{HR}$, $S_{VL}$ and $S_{VR}$ in the polarization scattering matrix $S_{CTLR}$ are determined, $$S_{HL} = \hat{S}_{HH} + j\hat{S}_{HV}$$

$$S_{HR} = \hat{S}_{HH} - j\hat{S}_{HV}$$

$$S_{VL} = \hat{S}_{VH} + j\hat{S}_{VV}$$

$$S_{VR} = \hat{S}_{VH} - j\hat{S}_{VV}$$

where $\hat{S}_{HH}$, $\hat{S}_{HV}$, $\hat{S}_{VH}$ and $\hat{S}_{VV}$ denote an echo of a linear polarimetric echo channel, $\hat{S}_{HH}$ denotes an echo of a linear polarimetric echo channel having a transmission channel H and a receiving channel H, $\hat{S}_{HV}$ denotes an echo of a linear polarimetric echo channel having a transmission channel V and a receiving channel H, $\hat{S}_{VV}$ denotes an echo of a linear polarimetric echo channel having a transmission channel H and a receiving channel V, $\hat{S}_{VV}$ denotes an echo of a linear polarimetric echo channel having a transmission channel V and a receiving channel V, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization; and The polarization scattering matrix for the echo data of the transmission signal is obtained according to the ground object scattering coefficients $S_{HL}$, $S_{HR}$, $S_{VL}$ and $S_{VR}$.

$S_{HL}$, $S_{HR}$, $S_{VL}$ and $S_{VR}$ in the polarization scattering matrix $S_{CTLR}$ are defined as follows:

$$S_{HL} = \hat{S}_{HH} + j\hat{S}_{HV}$$

$$S_{HR} = \hat{S}_{HH} - j\hat{S}_{HV}$$

$$S_{VL} = \hat{S}_{VV} + j\hat{S}_{VH}$$

$$S_{VR} = \hat{S}_{VV} - j\hat{S}_{VH}$$

$\hat{S}_{HH}$, $\hat{S}_{HV}$, $\hat{S}_{VV}$ and $\hat{S}_{VH}$ denote echoes of a linear polarimetric echo channel, $\hat{S}_{HV}$ denotes an echo of a linear polarimetric echo channel having a transmission channel V and a receiving channel H, and $\hat{S}_{HH}$, $\hat{S}_{VH}$ and $\hat{S}_{VV}$ denote in a similar way as $\hat{S}_{HV}$. According to the ground object scattering coefficients $S_{HL}$, $S_{HR}$, $S_{VL}$, and $S_{VR}$, the polarization scattering matrix for the echo data of the transmission signal is obtained.

At 105: an image is generated according to a polarization scattering matrix for the echo data of the modulated transmission signal. An image is generated according to a polarization scattering matrix for the echo data of the modulated transmission signal, thereby achieving a requirement for suppressing range ambiguity energy in the polarimetric SAR system. According to the polarization scattering matrix for the echo data of the modulated transmission signal, with taking an imaging system as a linear system, a quadruple polarimetric image based on the quadrature polarimetry may be restored from a complex image in a hybrid polarimetric SAR image domain.

In an embodiment, the operation that an image is generated according to a polarization scattering matrix for the echo data of the modulated transmission signal includes the following operations. A quadruple polarimetric image of a hybrid polarimetric SAR system is determined according to the polarization scattering matrix for the echo data of the modulated transmission signal. A quadrature polarimetric image of a quadrature polarimetric SAR system is determined according to the quadruple polarimetric image of the hybrid polarimetric SAR system. The quadruple polarimetric image of the quadrature polarimetric SAR system includes:

$$S_{HH} = \frac{1}{2} \cdot (S_{HL} + S_{HR})$$

$$S_{HV} = \frac{1}{2j} \cdot (S_{HL} - S_{HR})$$

$$S_{VH} = \frac{1}{2} \cdot (S_{VL} + S_{VR})$$

$$S_{VV} = \frac{1}{2j} \cdot (S_{VL} - S_{VR}),$$

where $S_{HH}$ denotes an image of a quadrature polarimetric echo channel having a transmission channel H and a receiving channel H, $S_{HV}$ denotes an image of a quadrature polarimetric echo channel having a transmission channel V and a receiving channel H, $S_{VH}$ denotes an image of a quadrature polarimetric echo channel having a transmission channel H and a receiving channel V, $S_{VV}$ denotes an image of a quadrature polarimetric echo channel having a transmission channel V and a receiving channel V, $S_{HL}$ denotes an image of an echo channel having a transmission channel L and a receiving channel H for the modulated transmission signal, $S_{HR}$ denotes an image of an echo channel having a transmission channel R and a receiving channel H for the modulated transmission signal, $S_{VL}$ denotes an image of an echo channel having a transmission channel L and a receiving channel V for the modulated transmission signal, $S_{VR}$ denotes an image of an echo channel having a transmission channel R and a receiving channel V for the modulated transmission signal, L denotes an electromagnetic wave polarization manner of the left circular polarization, R denotes an electromagnetic wave polarization manner of right circular polarization, H denotes an electromagnetic wave polarization manner of horizontal polarization, and V denotes an electromagnetic wave polarization manner of vertical polarization.

A quadruple polarimetric image of the hybrid polarimetric SAR system is determined according to the $S_{HL}$, $S_{HR}$, $S_{VL}$ and $S_{VR}$ of the polarization scattering matrix for the echo data of the modulated transmission signal in the hybrid polarimetric SAR system, and a quadruple polarimetric image of a quadrature polarimetric SAR system is determined according to the quadruple polarimetric image of the hybrid polarimetric SAR system. As the range ambiguity performance of a circular polarimetric image is optimized in waveform by an orthogonal signal, the range ambiguity performance of the quadruple polarimetric image is correspondingly improved.

In this embodiment of the disclosure, a pulse timing relationship of a transmission signal is determined, orthogonal nonlinear frequency modulation signals are determined. The transmission signal is modulated by using the orthogonal nonlinear frequency modulation signals. The modulated transmission signal is transmitted according to the pulse timing relationship, and echo data of the modulated transmission signal is determined. An image is generated according to a polarization scattering matrix for the echo data of the modulated transmission signal. Therefore, a requirement for suppressing range ambiguity energy in a polarimetric SAR system can be achieved.

The method for suppressing range ambiguity provided by the embodiments of the disclosure is described by operations of the method for suppressing range ambiguity in the hybrid polarimetric SAR system in this embodiment.

The hybrid quadrature polarimetric system, abbreviated as a hybrid polarimetric system, is a novel system different from a conventional quadrature polarimetric system. In the hybrid polarimetric SAR system, the system simultaneously transmits two spatially-orthogonal linear polarization (H and V) signals that are modulated alternately, to implement alternative transmission of a left circular polarization (LCP, L) wave or a right circular polarization (RCP, P) wave; and receives a signal by means of two spatially-orthogonal linear polarization H and V channels. In this way, regarding a composition of an echo signal, for example: echoes received on a same receiving channel for example the H channel or the V channel are approximately located at a same level in energy, which avoids a phenomenon that co-polarization ambiguity with strong energy has an impact on a cross-polarized signal with weak energy in a conventional quadrature polarimetric SAR system, and therefore improve range ambiguity performance of the system as compared with the quadrature polarimetric system.

In a spaceborne SAR system, an antenna shaping method may be used to lower an antenna side lobe corresponding to a range ambiguity region, for suppressing range ambiguity, and may be also used to reduce a pulse repetition frequency (PRF) to make a range ambiguity region away from an antenna main lobe, for suppressing range ambiguity. An existing method for suppressing range ambiguity includes antenna directional pattern shaping, azimuth phase coding (APC) and range digital beam forming (DBF) technologies.

Signal pulse compression is a frequency spectrum extension method, and is used for minimizing a peak power, maximizing an SNR and obtaining a target with a high-focusing resolution. The conventional SAR signal usually uses a linear frequency modulation (LFM) signal (Chirp signal) as a transmission pulse signal. Herein, the signal has a good pulse compression ratio, and can obtain a good target focusing effect in SAR imaging, and meets a requirement of a good SNR.

An ideal self-correlation function of an orthogonal signal waveform is in a form of ideal impulse function, and a cross-correlation function between a pair of orthogonal signal waveforms is zero. According to an energy conservation principle, no such an ideal signal exists. In this embodiment of the disclosure, the pair of orthogonal signal waveforms refers to two nonlinear frequency modulation (NLFM) signals based on a characteristic of noise-like. The self-correlation function of each of the two signals has a good pulse compression ratio, the cross-correlation function between the two signals is approximate to 0, and average energy of the cross-correlation function is far smaller than peak energy of the self-correlation function of each signal. Therefore, a good characteristic of approximation orthogonality is achieved.

The orthogonal signal waveform may be designed based on a special signal waveform index, for example, an impulse response width (IRW), a peak side lobe ratio (PSLR), an integrated side lobe ratio (ISLR), a self-correlation and cross-correlation energy ratio, etc. A greedy search algorithm is used to search for a pair of special orthogonal NLFM signals.

The hybrid polarimetric system conforms to a formation principle of range ambiguity energy due to a special transmitting-receiving timing relationship thereof, such as alternate transmission and simultaneous reception. A pair of orthogonal signal waveforms are transmitted alternately in the hybrid polarimetric SAR system. Due to a focusing characteristic of the self-correlation function and a non-focusing characteristic of the cross-correlation function of the pair of the orthogonal signal waveforms, the range ambiguity of the hybrid polarimetric SAR system may further be suppressed to some extent.

Figure 2:
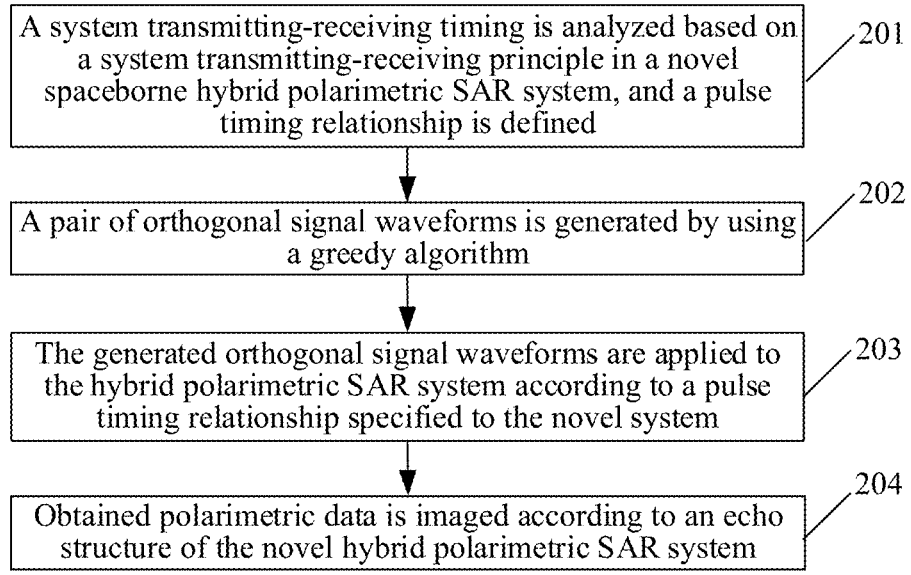
FIG. 2 is a schematic flowchart of a method for suppressing range ambiguity according to an embodiment of the disclosure.

FIG. 2 is a schematic flowchart of a method for suppressing range ambiguity according to an embodiment of the disclosure. As shown in FIG. 2, the method includes the following operations.

At 201: a transmitting-receiving timing of a novel spaceborne hybrid polarimetric SAR system is parsed based on a transmitting-receiving principle in the system, and a pulse timing relationship is defined.

Figure 3:
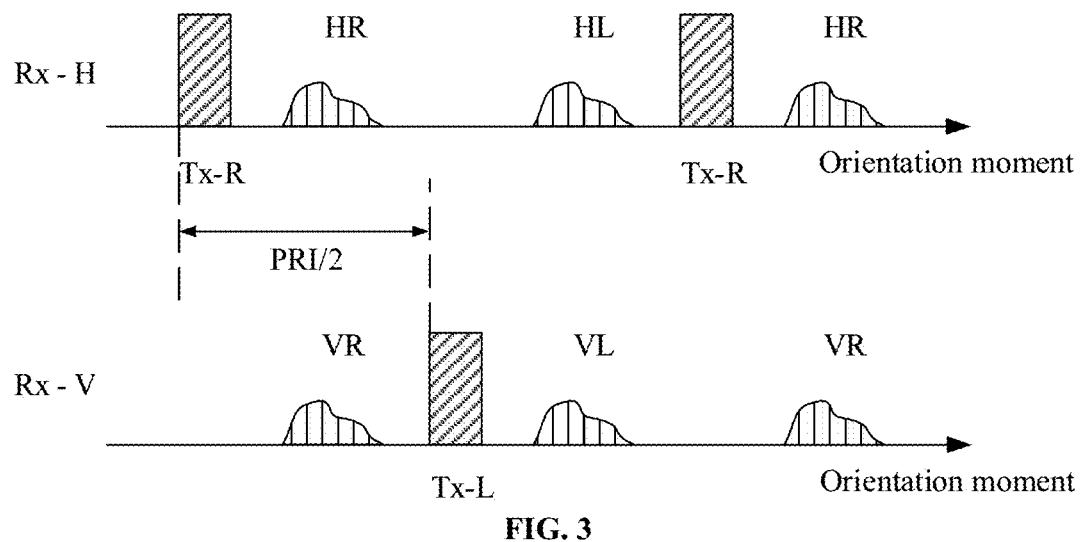
FIG. 3 illustrates a timing diagram for transmitting and receiving a signal in a novel hybrid polarimetric system according to an embodiment of the disclosure.

Specifically, in the hybrid polarimetric SAR system, a timing diagram for transmitting and receiving a signal in the hybrid polarimetric system is illustrated in FIG. 3. Supposed that a pulse repetition frequency (PRF) of a transmission signal of the system is denoted as 2PRF, and a pulse repetition interval (PRI) of a transmission pulse is defined as PRI=1/PRF, a continuous PRI of the system is denoted as PRI/2. For a single transmission channel such as L or R in alternate transmission, the PRF of the transmission signal is denoted as $PRF_S$=PRF, and the PRI of the transmission pulse is denoted as $PRI_S$=1/$PRF_S$=PRI. For echo reception of two channels such as the H channel and the V channel in the hybrid polarimetric SAR system, four channels [HL, HR, VL, VR] may be defined. Echoes received by four hybrid polarimetric channels are defined as $$S_{CTLR} = \begin{pmatrix} S_{HL} & S_{HR} \\ S_{VL} & S_{VR} \end{pmatrix}$$

according to a ground object scattering coefficient matrix $S_{CTLR}$ (Circular Transmit and Linear Receive, CTLR). Data of the four echo channels are represented as follows:

$$S_{HL} = \hat{S}_{HH} + j\hat{S}_{HV}$$

$$S_{HR} = \hat{S}_{HH} - j\hat{S}_{HV}$$

$$S_{VL} = \hat{S}_{VH} + j\hat{S}_{VV}$$

$$S_{VR} = \hat{S}_{VH} - j\hat{S}_{VV}$$

At 202, a pair of orthogonal signal waveforms is designed and generated in a search algorithm such as a greedy algorithm. Specifically, for an orthogonal signal waveform, the greedy algorithm is used in this embodiment of the disclosure to search for a pair of NLFM signals, each of which is based on a piecewise linear signal, in combination with a principle of a continuous piecewise signal based on the characteristic of the NLFM signal. The search principle meets:

(1) low self-correlation side lobe;
(2) narrow IRW;
(3) Low PSLR, and low ISLR; and
(4) low cross-correlation energy.

A pair of orthogonal NLFM signals searched are represented as $S_1(t)$ and $S_2(t)$. According to the above search principle, it may be known that:

1) With the characteristics of low IRW, low self-correlation side lobe, low PSLR and low ISLR of the signal $S_i(t)$, i=1, 2, the SAR system using the signal can obtain good image resolution performance.

2) As energy of a cross-correlation function between $S_1(t)$ and $S_2(t)$ is low and is generally 3 dB to 5 dB lower than self-correlation energy, the approximate orthogonal characteristic can be implemented.

At 203, the generated orthogonal signal waveforms are applied to the hybrid polarimetric SAR system according to a unique pulse timing relationship of the novel system. Specifically, the orthogonal signals $S_1(t)$ and $S_2(t)$ are applied to the hybrid polarimetric SAR system in a form of alternately transmitting signals $S_1$ and $S_2$. In this way, the transmitted LCP signal and the transmitted RCP signal are respectively modulated by $S_1$ and $S_2$. For example, it is supposed that LCP (L) signal is modulated by the signal $S_1$ in the following formula.

$$S_{HL} = \hat{S}_{HH} + j\hat{S}_{HV}, (s_1)$$

$$S_{HR} = \hat{S}_{HH} - j\hat{S}_{HV}, (s_2)$$

$$S_{VL} = \hat{S}_{VH} + j\hat{S}_{VV}, (s_1)$$

$$S_{VR} = \hat{S}_{VH} - j\hat{S}_{VV}, (s_2).$$

At With taken an HL channel $S_{HL}$ as an example, because of an alternate transmission characteristic of signals, a first ambiguous region of an echo of the HL channel is a range ambiguity echo of an HR channel. The signal $S_2$ different from the signal $S_1$ of the HL channel is employed by the HR channel. In this way, due to an orthogonal characteristic for the pair of signals, when the echo is imaged, the echo of $S_1$ of the HL channel can be well focused, and the range ambiguity echo of $S_2$ of the HR channel is defocused. As a result, the quality of a main HL image is not affected severely.

At 204: obtained polarimetric data is imaged according to an echo structure of a novel hybrid polarimetric SAR system.

Specifically, since an imaging system may be regarded as a linear system, a quadruple polarimetric image based on quadrature polarimetry may be restored from a complex image in a hybrid polarimetric SAR image domain:

$$S_{HH} = \frac{1}{2} \cdot (S_{HL} + S_{HR})$$

$$S_{HV} = \frac{1}{2j} \cdot (S_{HL} - S_{HR})$$

$$S_{VH} = \frac{1}{2} \cdot (S_{VL} + S_{VR})$$

$$S_{VV} = \frac{1}{2j} \cdot (S_{VL} - S_{VR})$$

As range ambiguity performance of a circular polarimetric image is optimized by the orthogonal signal waveform, range ambiguity performance of the quadruple polarimetric image is also correspondingly improved.

The method for suppressing range ambiguity provided by the embodiments of the disclosure is described by a specific optimization effect in this embodiment.

Primary simulation verification is performed on a two-dimensional target image in an embodiment of the disclosure.

Figure 4:
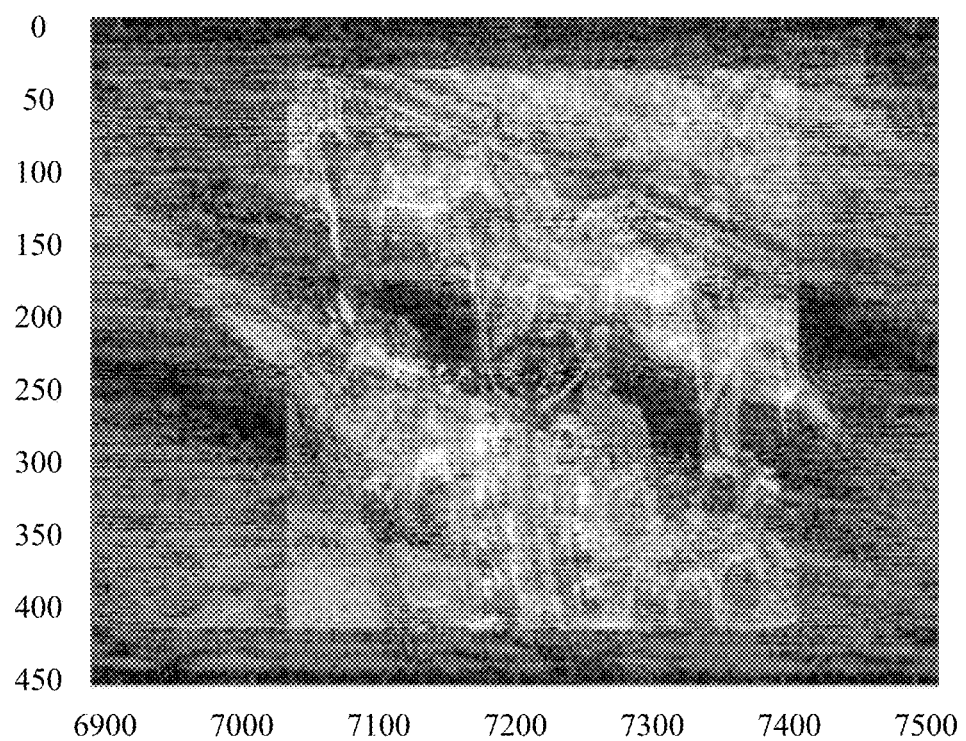
FIG. 4 illustrates a hybrid polarimetric SAR image generated by using a linear frequency modulation signal according to an embodiment of the disclosure.

FIG. 4 illustrates a simulation diagram of a hybrid polarimetric SAR system using a standard LFM signal. Through simulation, a two-dimensional image is generated from an echo according to a subsequent SAR imaging algorithm. The image includes a two-dimensional range ambiguity energy belonging to another region, that is, a first-order odd ambiguity region. Echoes of a main signal and an ambiguous signal use a same LFM signal. For the ease of clarity, the amplitude weighting of the ambiguous signal is consistent with that of the main signal. Upon generation of the echo, the image is taken as a verification reference image in this embodiment.

Figure 5:
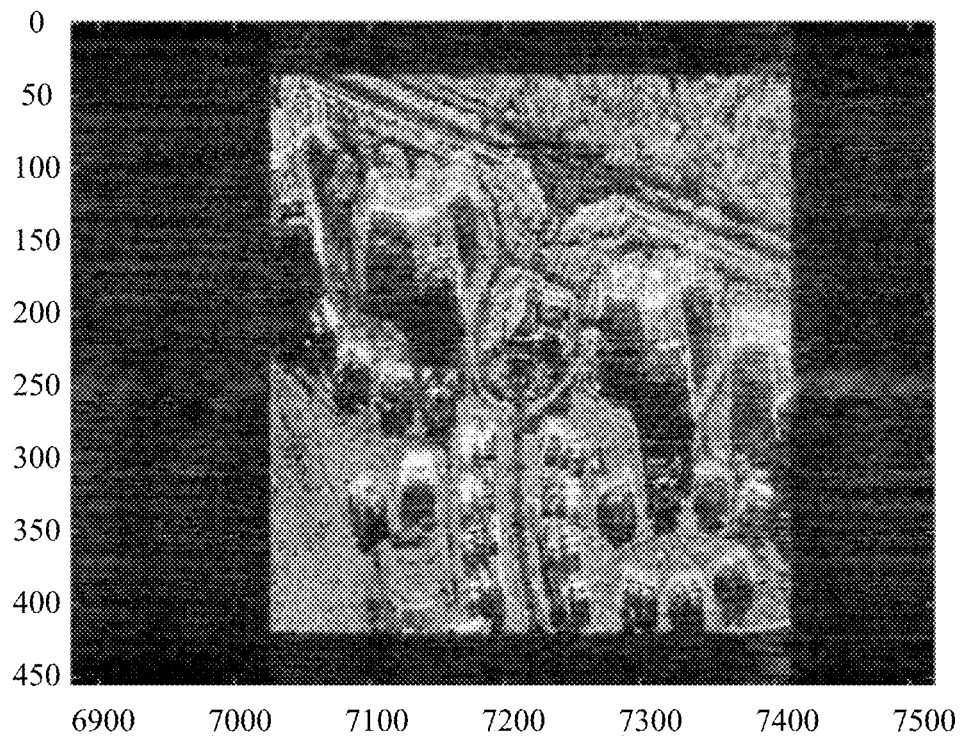
FIG. 5 illustrates a hybrid polarimetric SAR image using orthogonal nonlinear frequency modulation signals according to an embodiment of the disclosure.

FIG. 5 illustrates a simulation diagram of a hybrid polarimetric SAR system generated by a pair of NLFM signals that are transmitted alternately and orthogonal to each other. Through simulation, a two-dimensional image is generated from an echo according to a subsequent SAR imaging algorithm. The image includes two-dimensional range ambiguity energy belonging to another region, that is, a first-order odd ambiguity region. An echo of a main signal is generated by the signal $S_1$ in the pair of orthogonal signals in the specification, and an echo of an ambiguous signal is generated by the signal $S_2$ in the orthogonal signal pair in the specification.

It can be seen by comparing FIG. 4 with FIG. 5 that the image imaged based on the echo generated by the pair of orthogonal signals is significantly improved in capability of suppressing range ambiguity relative to an original image using the LFM signal.

As can be seen from the above description, the method provided by this embodiment of the disclosure can effectively utilize a timing characteristic of a novel hybrid polarimetric SAR system, and can suppress range ambiguity in the hybrid polarimetric SAR system well in combination with an advantage of an orthogonal signal.

Figure 6:
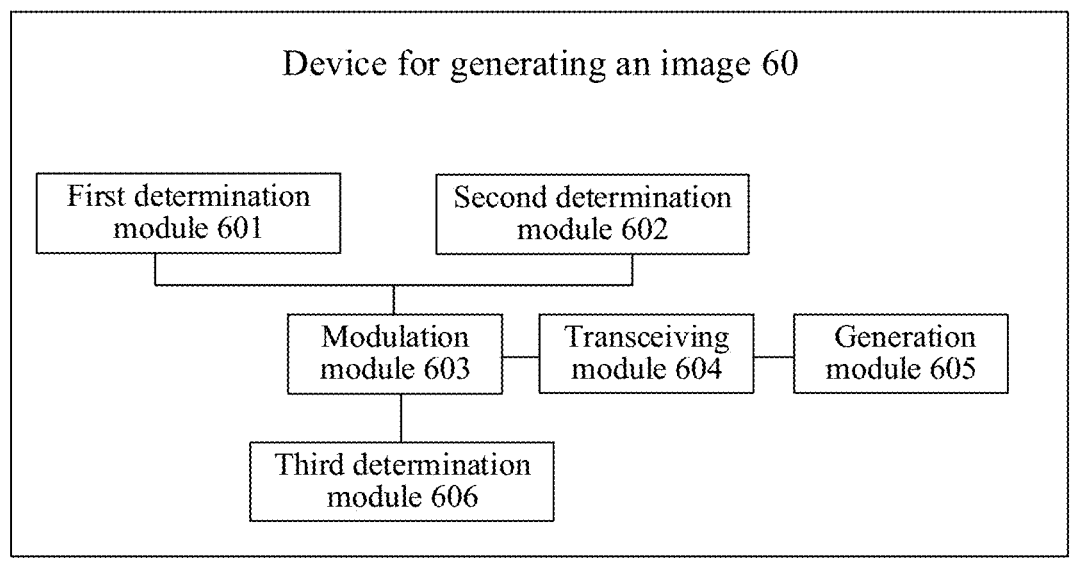
FIG. 6 is a schematic structural diagram of a device for suppressing range ambiguity according to an embodiment of the disclosure.

In this embodiment, a device for suppressing range ambiguity is provided. As illustrated in FIG. 6, the device 60 for suppressing range ambiguity includes: a first determination module 601, a second determination module 602, a modulation module 603, a transceiving module 604 and a generation module 605.

The first determination module 601 is configured to determine a pulse timing relationship of a transmission signal.

The second determination module 602 is configured to determine an orthogonal NLFM signal.

The modulation module 603 is configured to modulate the transmission signal by using the orthogonal NLFM signal.

The transceiving module 604 is configured to transmit the modulated transmission signal according to the pulse timing relationship, and determine echo data of the modulated transmission signal.

The generation module 605 is configured to generate an image according to a polarization scattering matrix for the echo data of the modulated transmission signal.

In an embodiment, the first determination module 601 is further configured to: determine the pulse timing relationship of the transmission signal according to a pulse repetition frequency of the transmission signal. The pulse timing relationship is defined as PRI=1/PRF, and PRF denotes the pulse repetition frequency of the transmission signal.

In an embodiment, the second determination module 602 is further configured to: determine a time-frequency relationship function of the NLFM signal according to a piecewise linear function; and determine a time domain function of the NLFM signal according to the time-frequency relationship function; determine a correlation performance parameter of the NLFM signal according to the time domain function; and determine a mathematical model of the NLFM signal according to the correlation performance parameter; initialize the NLFM signal according to pulse width and bandwidth settings of the NLFM signal; and perform iteration on the initialized NLFM signal by using an augmented Lagrange algorithm according to the mathematical model to obtain the orthogonal NLFM signal.

In an embodiment, the transmission signal includes an LCP signal and an RCP signal. The modulation module 603 is further configured to: modulate the LCP signal by using $s_1$, and modulate the RCP signal by using $s_2$. $s_1$ and $s_2$ denote the orthogonal NLFM signals.

In an embodiment, the device 60 further includes a third determination module 606, which is further configured to determine the polarization scattering matrix for the echo data of the transmission signal.

Correspondingly, the transceiving module 604 is further configured to: alternately transmit the modulated transmission signal according to the pulse timing relationship; and determine echo data of the modulated transmission signal according to the pulse timing relationship and the polarization scattering matrix. The echo data of the modulated transmission signal is represented in the form of the polarization scattering matrix $S_{CTLR}$, $$S_{CTLR} = \begin{pmatrix} S_{HL} & S_{HR} \\ S_{VL} & S_{VR} \end{pmatrix},$$

where, $$S_{HL} = \hat{S}_{HH} + j\hat{S}_{HV}, (s_1)$$

$$S_{HR} = \hat{S}_{HH} - j\hat{S}_{HV}, (s_2)$$

$$S_{VL} = \hat{S}_{VH} + j\hat{S}_{VV}, (s_1)$$

$$S_{VR} = \hat{S}_{VH} - j\hat{S}_{VV}, (s_2).$$

$S_{HL}$ denotes an echo of an echo channel having a transmission channel L and a receiving channel H for the modulated transmission signal, $S_{HR}$ denotes an echo of an echo channel having a transmission channel R and a receiving channel H for the modulated transmission signal, $S_{VL}$ denotes an echo of an echo channel having a transmission channel L and a receiving channel V for the modulated transmission signal, $S_{VR}$ denotes an echo of an echo channel having a transmission channel R and a receiving channel V for the modulated transmission signal, L denotes an electromagnetic wave polarization manner of LCP, R denotes an electromagnetic wave polarization manner of RCP, H denotes an electromagnetic wave polarization manner of horizontal polarization, and V denotes an electromagnetic wave polarization manner of vertical polarization.

In an embodiment, the third determination module 606 is further configured to: determine an expression $$S_{CTLR} = \begin{pmatrix} S_{HL} & S_{HR} \\ S_{VL} & S_{VR} \end{pmatrix}$$

of the polarization scattering matrix $S_{CTLR}$ for the echo data of the transmission signal, where $S_{HL}$ denotes an echo of an echo channel having a transmission channel L and a receiving channel H, $S_{HR}$ denotes an echo of an echo channel having a transmission channel R and a receiving channel H, $S_{VL}$ denotes an echo of an echo channel having a transmission channel L and a receiving channel V, $S_{VR}$ denotes an echo of an echo channel having a transmission channel R and a receiving channel V, L denotes an electromagnetic wave polarization manner of LCP, R denotes an electromagnetic wave polarization manner of RCP, H denotes an electromagnetic wave polarization manner of horizontal polarization, and V denotes an electromagnetic wave polarization manner of vertical polarization.

In an embodiment, the third determination module 606 is further configured to determine ground object scattering coefficients $S_{HL}$, $S_{HR}$, $S_{VL}$ and $S_{VR}$ in the polarization scattering matrix $S_{CTLR}$, where, $$S_{HL} = \hat{S}_{HH} + j\hat{S}_{HV}$$

$$S_{HR} = \hat{S}_{HH} - j\hat{S}_{HV}$$

$$S_{VL} = \hat{S}_{VH} + j\hat{S}_{VV}$$

$$S_{VR} = \hat{S}_{VH} - j\hat{S}_{VV},$$

where $\hat{S}_{HH}$, $\hat{S}_{HV}$, $\hat{S}_{VH}$ and $\hat{S}_{VV}$ denote echoes of a linear polarimetric echo channel, $\hat{S}_{HH}$ denotes an echo of a linear polarimetric echo channel having a transmission channel H and a receiving channel H, $\hat{S}_{HV}$ denotes an echo of a linear polarimetric echo channel having a transmission channel V and a receiving channel H, $\hat{S}_{VH}$ denotes an echo of a linear polarimetric echo channel having a transmission channel H and a receiving channel V, $\hat{S}_{VV}$ denotes an echo of a linear polarimetric echo channel having a transmission channel V and a receiving channel V, L denotes an electromagnetic wave polarization manner of LCP, R denotes an electromagnetic wave polarization manner of RCP, H denotes an electromagnetic wave polarization manner of horizontal polarization, and V denotes an electromagnetic wave polarization manner of vertical polarization.

The third determination module 606 is further configured to obtain the polarization scattering matrix for the echo data of the transmission signal according to the ground object scattering coefficient $S_{HL}$, $S_{HR}$, $S_{VL}$ and $S_{VR}$.

In an embodiment, the generation module 605 is further configured to: determine a quadruple polarimetric image of a hybrid polarimetric SAR system according to the polarization scattering matrix for the echo data of the modulated transmission signal; and determine a quadruple polarimetric image of a quadrature polarimetric SAR system according to the quadruple polarimetric image of the hybrid polarimetric SAR system.

The quadruple polarimetric image of the quadrature polarimetric SAR system includes:

$$S_{HH} = \frac{1}{2} \cdot (S_{HL} + S_{HR})$$

$$S_{HV} = \frac{1}{2j} \cdot (S_{HL} - S_{HR})$$

$$S_{VH} = \frac{1}{2} \cdot (S_{VL} + S_{VR})$$

$$S_{VV} = \frac{1}{2j} \cdot (S_{VL} - S_{VR}),$$

where $S_{HH}$ denotes an image of a quadrature polarimetric echo channel having a transmission channel H and a receiving channel H, $S_{HV}$ denotes an image of a quadrature polarimetric echo channel having a transmission channel V and a receiving channel H, $S_{VH}$ denotes an image of a quadrature polarimetric echo channel having a transmission channel H and a receiving channel V, $S_{VV}$ denotes an image of a quadrature polarimetric echo channel having a transmission channel V and a receiving channel V, $S_{HL}$ denotes an image of an echo channel having a transmission channel L and a receiving channel H for the modulated transmission signal, $S_{HR}$ denotes an image of an echo channel having a transmission channel R and a receiving channel H for the modulated transmission signal, $S_{VL}$ denotes an image of an echo channel having a transmission channel L and a receiving channel V for the modulated transmission signal, $S_{VR}$ denotes an image of an echo channel having a transmission channel R and a receiving channel V for the modulated transmission signal, L denotes an electromagnetic wave polarization manner of LCP, R denotes an electromagnetic wave polarization manner of RCP, H denotes an electromagnetic wave polarization manner of horizontal polarization, and V denotes an electromagnetic wave polarization manner of vertical polarization.

It is to be noted that when the device for suppressing range ambiguity provided by the above embodiment suppresses range ambiguity, the above division of program modules is merely illustrative. In actual applications, the above processing may be distributed to different program modules as required, that is, an internal structure of the device is divided into different program modules to implement all or a part of processing described above.

Based on the foregoing embodiment, an embodiment of the disclosure provides a device for suppressing range ambiguity, which includes a processor, and a memory configured to store a computer program capable of running on the processor. The processor implements the following operations when the computer program runs thereon.

A pulse timing relationship of a transmission signal is determined.

An orthogonal NLFM signal is determined.

The transmission signal is modulated by using the orthogonal NLFM signal.

The modulated transmission signal is transmitted according to the pulse timing sequence relationship, and echo data of the modulated transmission signal is determined.

An image is generated according to a polarization scattering matrix for the echo data of the modulated transmission signal.

Figure 7:
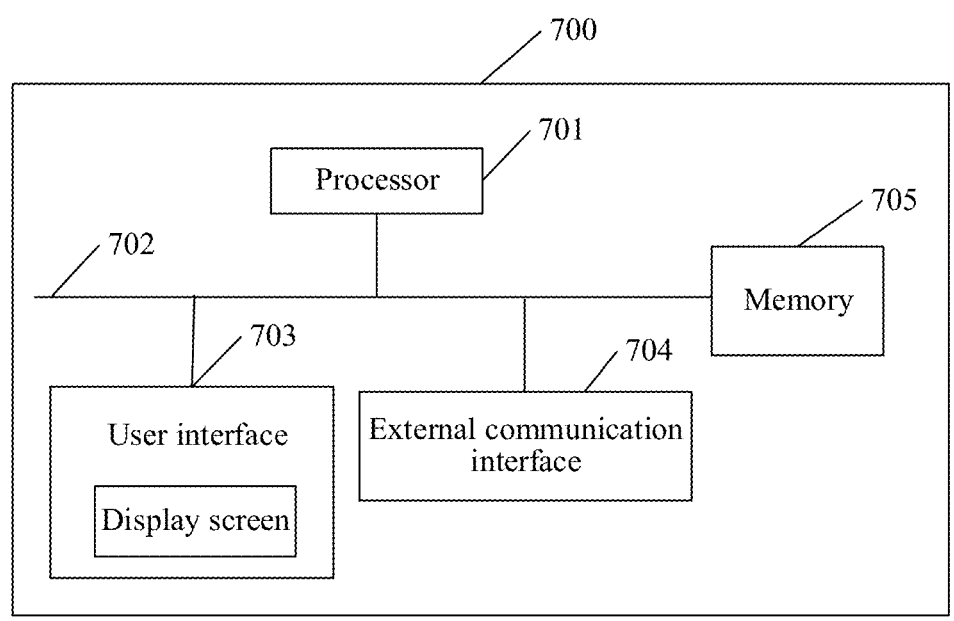
FIG. 7 is a schematic structural diagram of a device for suppressing range ambiguity according to an embodiment of the disclosure.

It should be noted that FIG. 7 is a schematic diagram of a hardware entity of a device for suppressing range ambiguity according to an embodiment of the disclosure. As shown in FIG. 7, the device 700 for suppressing range ambiguity includes: a processor 701, at least one communication bus 702, a user interface 703, at least one external communication interface 704 and a memory 705. The communication bus 702 is configured to implement connected communication among these components. The user interface 703 may include a display screen, and the external communication interface 704 may include a standard wired interface and a wireless interface.

The method disclosed in the above embodiment of the disclosure may be applied to the processor 701, or may be implemented by the processor 701. The processor 701 may be an integrated circuit chip, and has a signal processing capability. During implementation, each step of the above method may be implemented by means of an instruction in a form of an integrated logic circuit of hardware in the processor 701 or in a form of software. The processor 701 may be a universal processor, a DSP, or another programmable logic device, a separate gate or transistor logic device, a separate hardware component and the like. The processor 701 may implement or execute each method, step or logic block diagram disclosed in the embodiments of the disclosure. The universal processor may be a microprocessor, or any conventional processor, etc. The step of the method disclosed in combination with the embodiments of the disclosure may be directly executed or implemented by a hardware decoding processor, or a combination of hardware and software modules in the decoding processor. The software module may be disposed in a storage medium. The storage medium is disposed in the memory 705. The processor 701 reads information in the memory 705, and implements the steps of the above method in combination with hardware.

It may be understood that the memory (memory 705) in the embodiments of the disclosure may be a volatile memory or a nonvolatile memory, and may also include both the volatile memory and the nonvolatile memory. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc or a Compact Disc Read-Only Memory (CD-ROM). The magnetic surface memory may be a magnetic disk memory or a magnetic tape memory. The volatile memory may be a Random Access Memory (RAM), and serves as an external high-speed cache. Through illustrative but not restrictive description, many forms of RAMs may be used, for example, a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory described in this embodiment of the disclosure includes but is not limited to these and any other appropriate types of memories.

It is to be noted that the above terminal embodiment has similar description with the above method embodiment, and has the same beneficial effect as the method embodiment and will not be repeated thereto. Technical details not disclosed in the terminal embodiment of the disclosure may be understood by the person skilled in the art with reference to the description on the method embodiment of the disclosure, and will not be repeated for the ease of briefness.

In an exemplary embodiment, an embodiment of the disclosure further provides a computer storage medium, which is a computer readable storage medium, and includes, for example, the memory 705 for storing a computer program. The computer program may be processed by the processor 701 to implement the step of the above method. The computer readable storage medium may be memories such as an FRAM, an ROM, a PROM, an EPROM, an EEPROM, a Flash Memory, a magnetic surface memory, an optical disk, or a CD-ROM.

An embodiment of the disclosure further provides a computer readable storage medium having stored thereon a computer program. The computer program, when being executed by a processor, implements the following operations.

A pulse timing relationship of a transmission signal is determined.

An orthogonal NLFM signal is determined.

The transmission signal is modulated by using the orthogonal NLFM signal.

The modulated transmission signal is transmitted according to the pulse timing relationship, and echo data of the modulated transmission signal is determined.

An image is generated according to a polarization scattering matrix for the echo data of the modulated transmission signal.

It should be noted that the above computer medium embodiment has similar description with the above method embodiment, and has the same beneficial effects as the method embodiment and will not be repeated thereto. Technical details not disclosed in the terminal embodiment of the disclosure may be understood by the person skilled in the art with reference to the description on the method embodiment of the disclosure, and will not be repeated for the ease of briefness.

The forgoing is merely preferred embodiments of the disclosure, rather than a limit to the protection scope of the disclosure.

The invention claimed is:

1. A method for suppressing range ambiguity, comprising:
   determining a pulse timing relationship of a transmission signal;
   determining orthogonal nonlinear frequency modulation signals;
   modulating the transmission signals by using the orthogonal nonlinear frequency modulation signals;
   transmitting the modulated transmission signal according to the pulse timing relationship, and determining echo data of the modulated transmission signal; and
   generating an image according to a polarization scattering matrix for the echo data of the modulated transmission signal,
   wherein determining the orthogonal nonlinear frequency modulation signals comprises:
   determining a time-frequency relationship function of nonlinear frequency modulation signals according to a piecewise linear function, and determining a time domain function of the nonlinear frequency modulation signals according to the time-frequency relationship function;
   determining a correlation performance parameter of the nonlinear frequency modulation signals according to the time domain function, and determining a mathematical model of the nonlinear frequency modulation signals according to the correlation performance parameter;
   initializing the nonlinear frequency modulation signals according to pulse width and bandwidth settings of the nonlinear frequency modulation signals; and
   performing iteration on the initialized nonlinear frequency modulation signals by using an augmented Lagrange algorithm according to the mathematical model to obtain the orthogonal nonlinear frequency modulation signals.

2. The method of claim 1, wherein determining the pulse timing relationship of the transmission signal comprises:
   determining the pulse timing relationship of the transmission signal according to a pulse repetition frequency of the transmission signal, wherein the pulse timing relationship is represented as PRI=1/PRF, and PRF denotes the pulse repetition frequency of the transmission signal.

3. The method of claim 1, wherein the transmission signal comprises a left circular polarization signal and a right circular polarization signal, and modulating the transmission signal by using the orthogonal nonlinear frequency modulation signals comprises:
    modulating the left circular polarization signal by using $s_1$, and modulating the right circular polarization signal by using $s_2$, $s_1$ and $s_2$ being the orthogonal nonlinear frequency modulation signals.

4. The method of claim 1, further comprising: determining the polarization scattering matrix for the echo data of the transmission signal, and
    transmitting the modulated transmission signal according to the pulse timing relationship and determining echo data of the modulated transmission signal comprises:
    alternately transmitting the modulated transmission signal according to the pulse timing relationship; and
    determining the echo data of the modulated transmission signal according to the pulse timing relationship and the polarization scattering matrix, the echo data of the modulated transmission signal being represented in a form of the polarization scattering matrix $S_{CTLR}$, $$S_{CTLR} = \begin{pmatrix} S_{HL} & S_{HR} \\ S_{VL} & S_{VR} \end{pmatrix},$$

where, $$S_{HL} = \hat{S}_{HH} + j\hat{S}_{HV}, (s_1)$$

$$S_{HR} = \hat{S}_{HH} - j\hat{S}_{HV}, (s_2)$$

$$S_{VL} = \hat{S}_{VH} + j\hat{S}_{VV}, (s_1)$$

$$S_{VR} = \hat{S}_{VH} - j\hat{S}_{VV}, (s_1),$$

$S_{HL}$ denotes an echo of an echo channel having a transmission channel L and a receiving channel H for the modulated transmission signal, $S_{HR}$ denotes an echo of an echo channel having a transmission channel R and a receiving channel H for the modulated transmission signal, $S_{VL}$ denotes an echo of an echo channel having a transmission channel L and a receiving channel V for the modulated transmission signal, $S_{VR}$ denotes an echo of an echo channel having a transmission channel R and a receiving channel V for the modulated transmission signal, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

5. The method of claim 4, wherein the polarization scattering matrix $S_{CTLR}$ for the echo data of the transmission signal is represented as $$S_{CTLR} = \begin{pmatrix} S_{HL} & S_{HR} \\ S_{VL} & S_{VR} \end{pmatrix},$$

where $S_{HL}$ denotes an echo of an echo channel having a transmission channel L and a receiving channel H, $S_{HR}$ denotes an echo of an echo channel having a transmission channel R and a receiving channel H, $S_{VL}$ denotes an echo of an echo channel having a transmission channel L and a receiving channel V, $S_{VR}$ denotes an echo of an echo channel having a transmission channel R and a receiving channel V, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

6. The method of claim 4, wherein determining the polarization scattering matrix for the echo data of the transmission signal comprises:
    determining ground object scattering coefficients $S_{HL}$ $S_{HR}$ $S_{VL}$ and $S_{VR}$ in the polarization scattering matrix $S_{CTLR}$, where, $$S_{HL} = \hat{S}_{HH} + j\hat{S}_{HV}$$

$$S_{HR} = \hat{S}_{HH} - j\hat{S}_{HV}$$

$$S_{VL} = \hat{S}_{VH} + j\hat{S}_{VV}$$

$$S_{VR} = \hat{S}_{VH} - j\hat{S}_{VV},$$

where $\hat{S}_{HH}$, $\hat{S}_{HV}$, $\hat{S}_{VH}$ and $\hat{S}_{VV}$ denote echoes of a linear polarimetric echo channel, $\hat{S}_{HH}$ denotes an echo of a linear polarimetric echo channel having a transmission channel H and a receiving channel H, $\hat{S}_{HV}$ denotes an echo of a linear polarimetric echo channel having a transmission channel V and a receiving channel H, $\hat{S}_{VH}$ denotes an echo of a linear polarimetric echo channel having a transmission channel H and a receiving channel V, $\hat{S}_{VV}$ denotes an echo of a linear polarimetric echo channel having a transmission channel V and a receiving channel V, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization; and
    obtaining the polarization scattering matrix for the echo data of the transmission signal according to the ground object scattering coefficients $S_{HL}$, $S_{HR}$, $S_{VL}$ and $S_{VR}$.

7. The method of claim 1, wherein generating the image according to the polarization scattering matrix for the echo data of the modulated transmission signal comprises:
    determining a quadruple polarimetric image of a hybrid polarimetric synthetic aperture radar (SAR) system according to the polarization scattering matrix for the echo data of the modulated transmission signal; and
    determining a quadruple polarimetric image of a quadrature polarimetric SAR system according to the quadruple polarimetric image of the hybrid polarimetric SAR system,
    wherein the quadruple polarimetric image of the quadrature polarimetric SAR system comprises:

$$S_{HH} = \frac{1}{2} \cdot (S_{HL} + S_{HR})$$

$$S_{HV} = \frac{1}{2j} \cdot (S_{HL} - S_{HR})$$

$$S_{VH} = \frac{1}{2} \cdot (S_{VL} + S_{VR})$$

$$S_{VV} = \frac{1}{2j} \cdot (S_{VL} - S_{VR}),$$

where $S_{HH}$ denotes an image of a quadrature polarimetric echo channel having a transmission channel H and a receiving channel H, $S_{HV}$ denotes an image of a quadrature polarimetric echo channel having a transmission channel V and a receiving channel H, $S_{VH}$ denotes an image of a quadrature polarimetric echo channel having a transmission channel H and a receiving channel V, $S_{VV}$ denotes an image of a quadrature polarimetric echo channel having a transmission channel V and a receiving channel V, $S_{HL}$ denotes an image of an echo channel having a transmission channel L and a receiving channel H for the modulated transmission signal, $S_{HR}$ denotes an image of an echo channel having a transmission channel R and a receiving channel H for the modulated transmission signal, $S_{VL}$ denotes an image of an echo channel having a transmission channel L and a receiving channel V for the modulated transmission signal, $S_{VR}$ denotes an image of an echo channel having a transmission channel R and a receiving channel V for the modulated transmission signal, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

8. A device for suppressing range ambiguity, comprising:
a processor, and
a memory configured to store a computer program capable of running on the processor, wherein the processor, when the computer program runs thereon, executes operations of:
determining a pulse timing relationship of a transmission signal;
determining orthogonal nonlinear frequency modulation signals;
modulating the transmission signals by using the orthogonal nonlinear frequency modulation signals;
transmitting the modulated transmission signal according to the pulse timing relationship, and
determining echo data of the modulated transmission signal; and generating an image according to a polarization scattering matrix for the echo data of the modulated transmission signal,
wherein the processor, when the computer program runs thereon, further executes operations of:
determining a time-frequency relationship function of nonlinear frequency modulation signals according to a piecewise linear function, and determining a time domain function of the nonlinear frequency modulation signals according to the time-frequency relationship function;
determining a correlation performance parameter of the nonlinear frequency modulation signals according to the time domain function, and determining a mathematical model of the nonlinear frequency modulation signals according to the correlation performance parameter;
initializing the nonlinear frequency modulation signals according to pulse width and bandwidth settings of the nonlinear frequency modulation signals; and
performing iteration on the initialized nonlinear frequency modulation signals by using an augmented Lagrange algorithm according to the mathematical model to obtain the orthogonal nonlinear frequency modulation signals.

9. The device of claim 8, wherein the processor, when the computer program runs thereon, further executes an operation of:
determining the pulse timing relationship of the transmission signal according to a pulse repetition frequency of the transmission signal, wherein the pulse timing relationship is represented as PRI=1/PRF, and PRF denotes the pulse repetition frequency of the transmission signal.

10. The device of claim 8, wherein the transmission signal comprises a left circular polarization signal and a right circular polarization signal, and the processor, when the computer program runs thereon, further executes an operation of:
modulating the left circular polarization signal by using $S_1$, and modulating the right circular polarization signal by using $S_2$, $S_1$ and $S_2$ being the orthogonal nonlinear frequency modulation signals.

11. The device of claim 8, wherein the processor, when the computer program runs thereon, further executes operations of:
transmitting the modulated transmission signal according to the pulse timing relationship and determining echo data of the modulated transmission signal comprises:
alternately transmitting the modulated transmission signal according to the pulse timing relationship; and
determining the echo data of the modulated transmission signal according to the pulse timing relationship and the polarization scattering matrix, the echo data of the modulated transmission signal being represented in a form of the polarization scattering matrix $S_{CTLR}$ $$S_{CTLR} = \begin{pmatrix} S_{HL} & S_{HR} \\ S_{VL} & S_{VR} \end{pmatrix},$$

where, $$S_{HL} = \hat{S}_{HH} + j\hat{S}_{HV}, (s_1)$$

$$S_{HR} = \hat{S}_{HH} - j\hat{S}_{HV}, (s_2)$$

$$S_{VL} = \hat{S}_{VH} + j\hat{S}_{VV}, (s_1)$$

$$S_{VR} = \hat{S}_{VH} - j\hat{S}_{VV}, (s_2),$$

$S_{HL}$ denotes an echo of an echo channel having a transmission channel L and a receiving channel H for the modulated transmission signal, $S_{HR}$ denotes an echo of an echo channel having a transmission channel R and a receiving channel H for the modulated transmission signal, $S_{VL}$ denotes an echo of an echo channel having a transmission channel L and a receiving channel V for the modulated transmission signal, $S_{VR}$ denotes an echo of an echo channel having a transmission channel R and a receiving channel V for the modulated transmission signal, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

12. The device of claim 11, wherein the polarization scattering matrix $S_{CTLR}$ for the echo data of the transmission signal is represented as $$S_{CTLR} = \begin{pmatrix} S_{HL} & S_{HR} \\ S_{VL} & S_{VR} \end{pmatrix},$$

where $S_{HL}$ denotes an echo of an echo channel having a transmission channel L and a receiving channel H, $S_{HR}$ denotes an echo of an echo channel having a transmission channel R and a receiving channel H, $S_{VL}$ denotes an echo of an echo channel having a transmission channel L and a receiving channel V, $S_{VR}$ denotes an echo of an echo channel having a transmission channel R and a receiving channel V, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

13. The device of claim 11, wherein the processor, when the computer program runs thereon, further executes operations of:

determining ground object scattering coefficients $S_{HL}$, $S_{HR}$, $S_{VL}$ and $S_{VR}$ in the polarization scattering matrix $S_{CTLR}$, where, $S_{HL} = \hat{S}_{HH} + j\hat{S}_{HV}$ $S_{HR} = \hat{S}_{HH} - j\hat{S}_{HV}$ $S_{VL} = \hat{S}_{VH} + j\hat{S}_{VV}$ $S_{VR} = \hat{S}_{VH} - j\hat{S}_{VV}$, where $\hat{S}_{HH}$, $\hat{S}_{HV}$, $\hat{S}_{VH}$ and $\hat{S}_{VV}$ denote echoes of a linear polarimetric echo channel, $\hat{S}_{HH}$ denotes an echo of a linear polarimetric echo channel having a transmission channel H and a receiving channel H, $\hat{S}_{HV}$ denotes an echo of a linear polarimetric echo channel having a transmission channel V and a receiving channel H, $\hat{S}_{VH}$ denotes an echo of a linear polarimetric echo channel having a transmission channel H and a receiving channel V, $\hat{S}_{VV}$ denotes an echo of a linear polarimetric echo channel having a transmission channel V and a receiving channel V, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization; and obtaining the polarization scattering matrix for the echo data of the transmission signal according to the ground object scattering coefficients $S_{HL}$, $S_{HR}$, $S_{VL}$ and $S_{VR}$.

14. The device of claim 8, wherein the processor, when the computer program runs thereon, further executes operations of:

determining a quadruple polarimetric image of a hybrid polarimetric synthetic aperture radar (SAR) system according to the polarization scattering matrix for the echo data of the modulated transmission signal; and determining a quadruple polarimetric image of a quadrature polarimetric SAR system according to the quadruple polarimetric image of the hybrid polarimetric SAR system, wherein the quadruple polarimetric image of the quadrature polarimetric SAR system comprises:

$S_{HH} = \frac{1}{2} \cdot (S_{HL} + S_{HR})$ $S_{HV} = \frac{1}{2j} \cdot (S_{HL} - S_{HR})$ $S_{VH} = \frac{1}{2} \cdot (S_{VL} + S_{VR})$ $S_{VV} = \frac{1}{2j} \cdot (S_{VL} - S_{VR})$, where $S_{HH}$ denotes an image of a quadrature polarimetric echo channel having a transmission channel H and a receiving channel H, $S_{HV}$ denotes an image of a quadrature polarimetric echo channel having a transmission channel V and a receiving channel H, $S_{VH}$ denotes an image of a quadrature polarimetric echo channel having a transmission channel H and a receiving channel V, $S_{VV}$ denotes an image of a quadrature polarimetric echo channel having a transmission channel V and a receiving channel V, $S_{HL}$ denotes an image of an echo channel having a transmission channel L and a receiving channel H for the modulated transmission signal, $S_{HR}$ denotes an image of an echo channel having a transmission channel R and a receiving channel H for the modulated transmission signal, $S_{VL}$ denotes an image of an echo channel having a transmission channel L and a receiving channel V for the modulated transmission signal, $S_{VR}$ denotes an image of an echo channel having a transmission channel R and a receiving channel V for the modulated transmission signal, L denotes an electromagnetic wave polarization manner of left circular polarization, R denotes an electromagnetic wave polarization manner of right circular polarization, H denotes an electromagnetic wave polarization manner of horizontal polarization, and V denotes an electromagnetic wave polarization manner of vertical polarization.

15. A non-transitory computer readable storage medium having stored thereon a computer program, wherein the computer program, when being executed by a processor, implements operations of:

determining a pulse timing relationship of a transmission signal;

determining orthogonal nonlinear frequency modulation signals;

modulating the transmission signals by using the orthogonal nonlinear frequency modulation signals;

transmitting the modulated transmission signal according to the pulse timing relationship, and determining echo data of the modulated transmission signal; and generating an image according to a polarization scattering matrix for the echo data of the modulated transmission signal, wherein the computer program, when being executed by the processor, implements operations of:

determining a time-frequency relationship function of nonlinear frequency modulation signals according to a piecewise linear function, and determining a time domain function of the nonlinear frequency modulation signals according to the time-frequency relationship function;

determining a correlation performance parameter of the nonlinear frequency modulation signals according to the time domain function, and determining a mathematical model of the nonlinear frequency modulation signals according to the correlation performance parameter;

initializing the nonlinear frequency modulation signals according to pulse width and bandwidth settings of the nonlinear frequency modulation signals; and performing iteration on the initialized nonlinear frequency modulation signals by using an augmented Lagrange algorithm according to the mathematical model to obtain the orthogonal nonlinear frequency modulation signals.

16. The non-transitory computer readable storage medium of claim 15, wherein the computer program, when being executed by the processor, implements an operation of:

determining the pulse timing relationship of the transmission signal according to a pulse repetition frequency of the transmission signal, wherein the pulse timing relationship is represented as PRI=1/PRF, and PRF denotes the pulse repetition frequency of the transmission signal.

17. The non-transitory computer readable storage medium of claim 15, wherein the transmission signal comprises a left circular polarization signal and a right circular polarization signal, and the computer program, when being executed by the processor, implements an operation of:

modulating the left circular polarization signal by using $s_1$, and modulating the right circular polarization signal by using $s_2$, $s_1$ and $s_2$ being the orthogonal nonlinear frequency modulation signals.

* * * * *